& Tucker

United States Patent [19]
Bolton, Jr.

[11] Patent Number: 4,846,123
[45] Date of Patent: Jul. 11, 1989

[54] FLYWHEEL-ASSOCIATED COUNTERWEIGHT APPARATUS FOR REDUCING VIBRATION IN A SINGLE CYLINDER INTERNAL COMBUSTION ENGINE

[75] Inventor: Albert M. Bolton, Jr., Shreveport, La.

[73] Assignee: White Consolidated Industries, Inc., Cleveland, Ohio

[21] Appl. No.: 134,206

[22] Filed: Dec. 17, 1987

[51] Int. Cl.⁴ .................. F16F 15/28; F16F 15/30
[52] U.S. Cl. ........................ 123/192 B; 74/573 R
[58] Field of Search ........... 74/573; 123/192 R, 192 B

[56] References Cited

U.S. PATENT DOCUMENTS

| | | | |
|---|---|---|---|
| 3,415,237 | 12/1968 | Harkness | 123/192 B |
| 4,003,265 | 1/1977 | Craig et al. | 74/573 R X |
| 4,262,548 | 4/1981 | Haft et al. | 123/192 B X |
| 4,404,706 | 9/1983 | Loyd | 417/234 X |
| 4,522,612 | 6/1985 | Frazer | 74/573 R X |
| 4,539,864 | 9/1985 | Wiebe | 74/573 R |

FOREIGN PATENT DOCUMENTS

| | | | |
|---|---|---|---|
| 155013 | 5/1982 | Fed. Rep. of Germany | 74/573 R |
| 1837 | 1/1984 | Japan | 123/192 B |

*Primary Examiner*—Tony M. Argenbright
*Assistant Examiner*—Eric R. Carlberg
*Attorney, Agent, or Firm*—Hubbard, Thurman, Turner & Tucker

[57] ABSTRACT

A single cylinder internal combustion engine in a portable power tool is provided with a flywheel counterweight member which functions to substantially reduce engine vibration attributable to linear inertial and reactive forces of the engine's reciprocating mass (including its piston, piston pin, piston pin bearing, and connecting rod) when the piston is adjacent its top dead center and bottom dead center positions. The counterweight member is slidably mounted on the crankshaft, and is captively retained thereon closely adjacent the flywheel, by a retaining sleeve also slidably mounted on the crankshaft. Alignable dimples on the counterweight and the flywheel facilitate the installation of the counterweight in the correct rotational orientation on the crankshaft. A narrow locking arm portion of the counterweight member is closely received and retained between an adjacent pair of cooling impeller blades on the flywheel to prevent rotation of the counterweight relative to the flywheel, thereby locking the counterweight in its correctly aligned rotational orientation. The counterweight, being independent of the flywheel, does not alter the balance of the flywheel and therefore does not impose a centrifugal bursting force thereon.

20 Claims, 3 Drawing Sheets

FLYWHEEL-ASSOCIATED COUNTERWEIGHT APPARATUS FOR REDUCING VIBRATION IN A SINGLE CYLINDER INTERNAL COMBUSTION ENGINE

BACKGROUND OF THE INVENTION

The present invention relates generally to internal combustion engines, and more particularly provides apparatus for reducing vibration in single cylinder engines typically utilized to drive portable rotary power tools such as flexible line trimmers, lawn edgers or brush cutters, and other portable rotary power tools such as snow throwers, shaft mounted blowers and the like, as well as single cylinder engines used in other applications.

In the design of single cylinder internal combustion engines of this general type, it is well known that essentially all of the rotating mass of the engine can be effectively balanced by appropriately configuring and sizing the crankshaft counterweight to thereby essentially eliminate the vibratory effects of such rotating mass. There are, however, forces within a single cylinder engine which cannot be overcome by the mass of the crankshaft counterweight. Such forces include the reciprocating mass of the piston and its associated connecting rod, and the forces required to suddenly accelerate and decelerate such reciprocating mass at the top dead center (TDC) and bottom dead center (BDC) positions of the piston. It is at these two positions where the single piston instantaneously comes to rest before changing directions in its reciprocable travel path. Adjacent the TDC and BDC positions of the piston, the piston and its associated connecting rod generate linearly directed inertia and reactive forces which are transmitted to the crankshaft in a direction transverse to its axis. These linear inertia and reactive forces tend to "rock" the crankshaft about its supporting bearing structure such that the connecting rod end of the crankshaft is moved in one direction and the flywheel end of the crankshaft "reacts" by moving in the opposite direction. This linear force-induced rocking of the crankshaft generates engine vibration which is not compensated for by the rotating counterweight portion of the crankshaft.

A previously proposed solution to this inertia-induced engine vibration has been to drill a small hole in the flywheel in an appropriate rotational orientation thereon, and then thread a screw, with an associated lock nut thereon, into the hole. The installed screw and associated nut act as a flywheel-mounted counterweight which, when the piston is adjacent its TDC or BDC position, exerts a force on the flywheel end of the crankshaft which is designed to offset the rocking moment imposed on the crankshaft by the piston and its connecting rod.

This conventional approach to reducing piston inertia-induced engine vibration, however, has distinct disadvantages from both safety and manufacturing standpoints. The primary disadvantage of this technique is that it imbalances the flywheel itself, thereby creating in the rapidly rotating flywheel a radially directed bursting force. It can readily be seen that this bursting force can potentially create a safety hazard associated with the previously carefully balanced flywheel.

Additionally, from a manufacturing standpoint, several additional fabrication steps are required in the production of the engine. The flywheel must be properly positioned so that the screw hole is precisely oriented thereon, the hole itself needs to be carefully formed in the correctly positioned flywheel, and the screw and its associated locknut must then be connected and carefully tightened into the flywheel hole. Moreover, of course, there is always the possibility that the screw and nut can work loose during engine operation and be thrown at high speed from the flywheel.

In view of the foregoing, it is an object of the present invention to provide improved apparatus for reducing inertiainduced vibration in a single cylinder engine of the type described to thereby eliminate or minimize above-mentioned and other problems, limitations and disadvantages typically associated with conventional solutions to this type of engine vibration.

SUMMARY OF THE INVENTION

In carrying out principles of the present invention, in accordance with a preferred embodiment thereof, a representative air cooled, single cylinder internal combustion engine used to drive a portable rotary powered tool, such as a flexible line trimmer, is provided with counterweight apparatus which, in a very safe, cost effective and efficient manner, substantially reduces engine vibration attributable to linear inertial forces of the engine's piston and connecting rod portions when the piston is adjacent its TDC and BDC positions.

The representative single cylinder engine is of the two stroke cycle type, and includes a crankshaft rotatably supported by a suitable bearing structure positioned between oppositely projecting end portions of the crankshaft. One of these end portions is provided with the usual crankshaft counterweight and is operatively connected to the piston connecting rod. The opposite end portion of the crankshaft has a flywheel coaxially secured thereto, the flywheel being provided with a circumferentially spaced series of axially projecting impeller blade elements which function, during rotation of the flywheel, to flow cooling air across the engine in a conventional manner.

In a preferred embodiment thereof, the vibration reducing apparatus of the present invention comprises a small metal counterweight member which is slidably received on the crankshaft, and is captively retained thereon closely adjacent the bladed end of the flywheel, by a retaining sleeve element also slidably mounted on the crankshaft. Alignable dimples on the counterweight and the flywheel facilitate the installation of the counterweight in the correct rotational orientation on the crankshaft. A narrow, radially extending outer locking arm portion of the counterweight member is closely received between an adjacent pair of impeller blades on the flywheel to prevent rotation of the counterweight relative to the flywheel, thereby locking the counterweight in its correctly aligned rotational orientation.

The counterweight, which extends along an axis generaly perpendicular to the crankshaft axis, is rotationally oriented on the crankshaft in a manner such that during the periods in which the piston reaches its TDC and BDC positions and then reverses direction, the counterweight axis is swung through a parallel relationship with the piston axis, and the counterweight centrifugal force directly counters the crankshaft rocking moments created by the piston and its connecting rod during such periods, thereby substantially reducing inertially induced engine virbration.

The flywheel-associated counterweight of the present invention provides a variety of advantages over conventional approaches to reducing this type of vibration in single cylinder engines. Quite importantly, the counterweight does not affect the critical balance of the flywheel, and accordingly does not impose any centrifugal burst forces thereon. Instead, the counterweight's centrifugal counter force is transmitted directly to the crankshaft and is not transmitted thereto through the flywheel. Despite the fact that the counterweight of the present invention is an element separate from the flywheel, the flywheel is uniquely utilized in the manner described above to accurately orient the counterweight on the crankshaft without the necessity for additional locking means.

Additionally, the counterweight is very inexpensive to manufacture and may be quickly installed on the crankshaft, and properly aligned thereon, without using any tools. Moreover, since the counterweight is slidably received and captively retained on the crankshaft, it cannot work loose from and be thrown from the shaft during engine operation.

In summary, it can readily be seen that the present invention provides a cost effective, reliable and safe method of reducing inertially induced vibration in a single cylinder engine of the type commonly used to drive a variety of portable rotary powered tools. It can also be seen, however, that the principles of the present invention could be applied as well to a variety of single cylinder internal combustion engines used in other applications as well.

DETAILED DESCRIPTION

Figures 1, 6A, 6B, 6C:
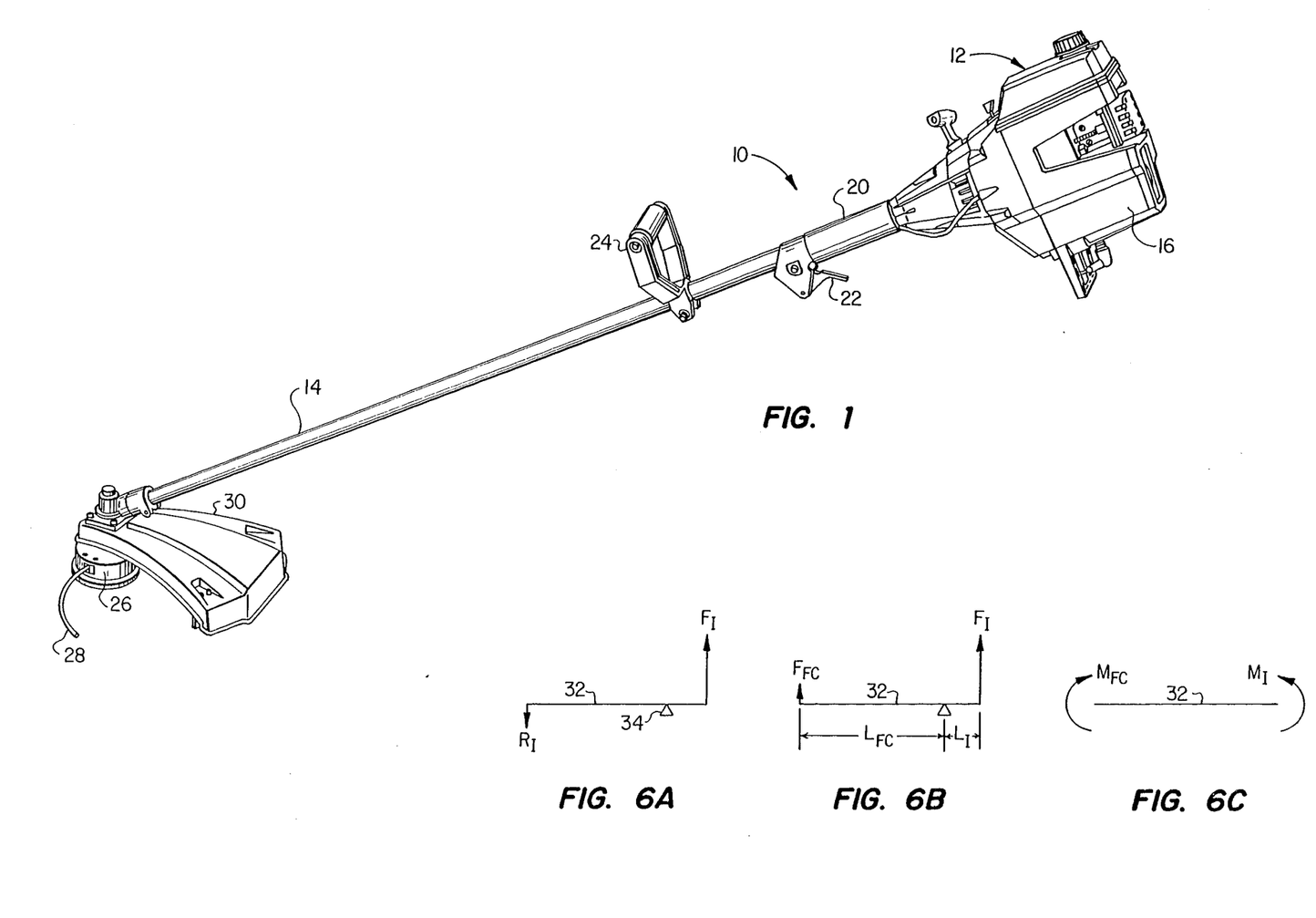
FIG. 1 is a perspective view of a representative gasoline engine powered flexible line trimmer in which a flywheelassociated counterweight that embodies principles of the present invention is incorporated.
FIGS. 6A–6C are schematic force diagrams illustrating the manner in which the flywheel counterweight functions to significantly reduce engine vibration attributable to piston and connecting rod linear inertia and reactive forces.

The present invention provides unique apparatus for substantially reducing vibration in a single cylinder internal combustion engine of the type commonly used to drive a portable rotary power tool such as the flexible line trimmer 10 perspectively illustrated in FIG. 1. While the vibration reducing principles of the present invention will be described in conjunction with the representative line trimmer 10, it will be readily appreciated by those skilled in the internal combusiton engine art that such principles are applicable as well to similar engines used in a wide variety of alternate applications.

Trimmer 10 includes a power head assembly 12 mounted on one end of an elongated shaft 14 and including a shroud structure 16 within which is disposed a single cylinder, air cooled, two stroke cycle engine 18 (FIG. 2) used to power the trimmer 10. Spaced forwardly of the power head 12 along the shaft 14 are a rear operator hand grip 20 and an associated throttle lever 22, and a front operator handle 24. Connected to the lower left end of the shaft 14 is a rotationally drivable cutting head 26 which is driven by the engine 18 (via a flexible drive system within the shaft) to rapidly rotate a length of flexible trimming line 28 in a cutting plane disposed perpendicularly to the rotational axis of the cutting head 26. A protective shield member 30 is also connected to the left end of the shaft 14 and functions to protect the trimmer operator from the rapidly spinning line segment 28 used to trim vegetation of various types.

Figure 2:
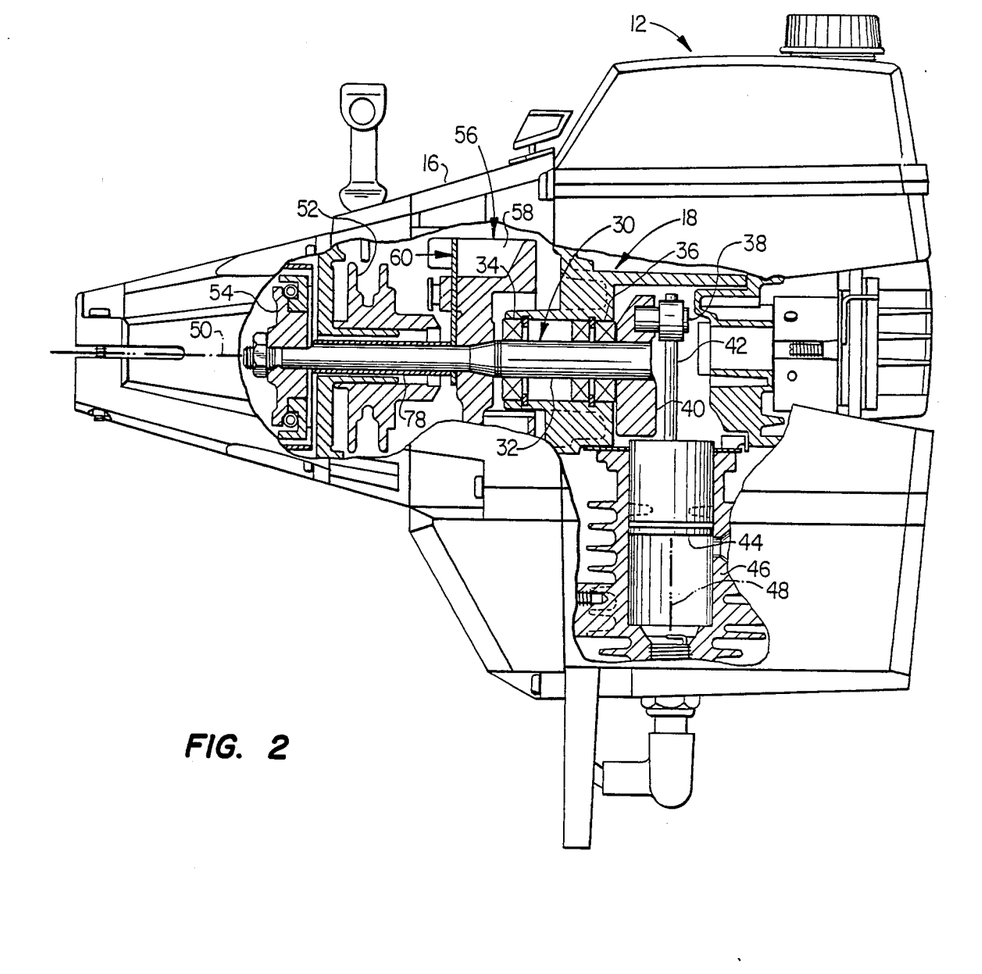
FIG. 2 is an enlarged scale, partially cut away and sectioned side elevational view of the power head section of the trimmer, and illustrates a portion of its engine including the flywheel, crankshaft, and flywheel counterweight.
Figure 3:
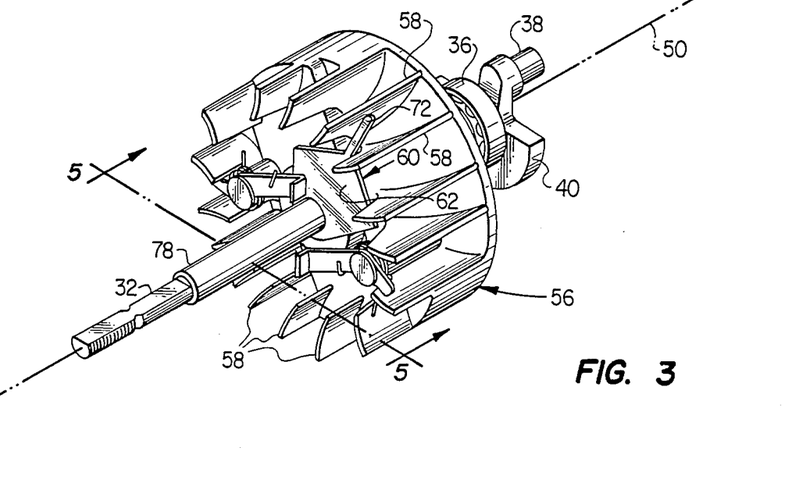
FIG. 3 is a perspective view of the assembled flywheel, crankshaft and flywheel counterweight.
Figures 4, 5, 7A, 7B:
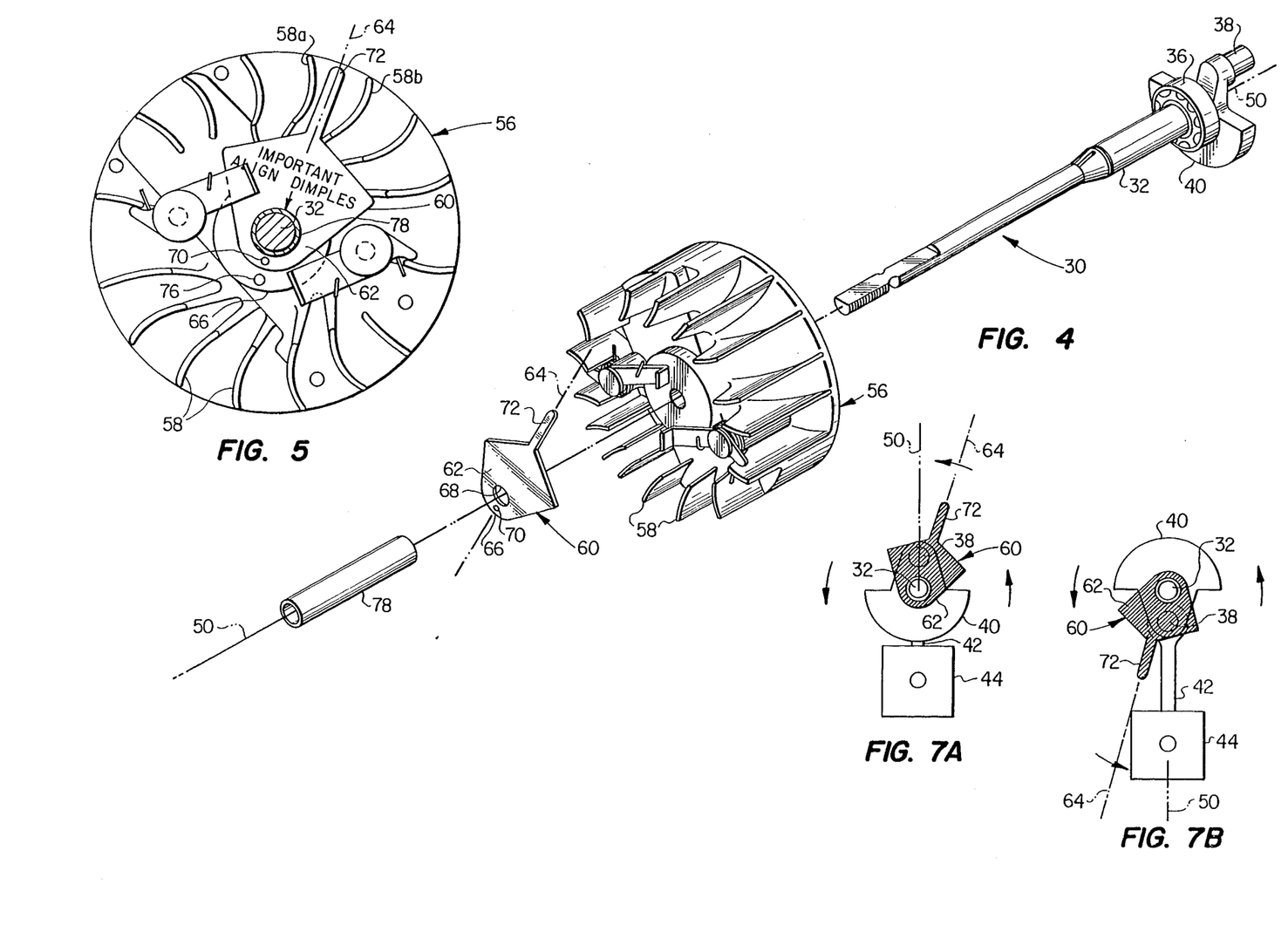
FIG. 4 is an exploded perspective view of the assembly of FIG. 3.
FIG. 5 is a cross-sectional view through the assembly of FIG. 3, taken along line 5—5 thereof.
FIGS. 7A and 7B are schematic positional diagrams illustrating the relative positions of the piston and the flywheel counterweight when the piston is in its bottom dead center and top dead center positions, respectively.

Referring now to FIGS. 2-4, the single cylinder engine 18 includes a crankshaft assembly 30 comprising an elongated crankshaft portion 32 rotatably supported along a longitudinally intermediate portion thereof by a bearing structure which includes a main crank inner bearing 36 secured to the shaft adjacent its right or inner end, and a main crank outer bearing 34 secured to the shaft adjacent the left end of the crankcase. Also secured to the right end portion of the shaft 32 outwardly of its bearing 36 is a crank pin 38 and a conventional crankshaft counterweight 40. Crank pin 38 is operatively secured to one end of a connecting rod 42 which is connected at its opposite end to the engine's single piston 44. Piston 44 is slidably received within an externally finned cylinder 46 for reciprocating motion therein along an axis 48 which is perpendicular to the crankshaft axis 50.

The longitudinal portion of the crankshaft 32 positioned leftwardly of the bearing 36 is extended at its outer end through a recoil starter assembly 52 and has a centrifugal clutch assembly 54 fixedly secured to its outer or left end. The engine 18 is also provided with a flywheel 56 which is coaxially received on the crankshaft 32, is rotationally locked thereto, and is positioned between the outer crank bearing 34 and the manual starter assembly 52. Flywheel 56 has formed along its left end a circumferentially spaced series of axially extending impeller blades 58 which, during rotation of the flywheel 56, function in a conventional manner to flow cooling air rightwardly across the balance of the engine.

Referring now to FIGS. 6A–6C, 7A and 7B, during the periods in which the piston 44 reaches its bottom dead center (BDC) and top dead center (TDC) positions (FIGS. 7A and 7B, respectively), and then changes direction, the piston 44 and its connecting rod 42 exert linear inertia and reactive forces $F_I$ on the right end of the crankshaft 32, thereby producing a moment $M_I$ on the crankshaft which is equal to $F_I \times L_I$ and tends to "rock" the crankshaft about its supporting bearing structure 34 and induce an oppositely directed reaction $R_I$ on the flywheel end portion of the crankshaft. This linear inertia and reactive force-induced rocking of the crankshaft causes engine vibration of a type that the crankshaft counterweight 40 cannot compensate for. It is to the substantial reduction of this type of engine vibration that the present invention is primarily directed to.

To substantially reduce this type of engine vibration, the present invention uniquely provides a small metal counterweight member 60 which is best illustrated in FIGS. 4 and 5. Counterweight 60 is of a plate-like construction and has a relative wide base portion 62 which is centered about an axis 64 extending perpendicularly to the crankshaft axis 50. Base portion 62 has a curved end 66, an axially centered circular opening 68 extending therethrough adjacent the end 66, and an alignment dimple 70 positioned between the end 66 and the opening 70. Extending outwardly from the base portion 62, along the axis 64, is an elongated, relatively narrow locking and alignment arm portion 72 of the counterweight 60.

The counterweight member 60 is very rapidly and easily installed on the crankshaft 32, subsequent to the installation of the flywheel 56 thereon, by inserting the left end of the crankshaft 32 into the counterweight opening 68 and then sliding the counterweight 60 along the crankshaft toward the flywheel until the counterweight base portion 62 is brought into abutment with a centrally disposed, axially facing surface portion 74 (FIG. 5) of the flywheel 56. Proper rotational orientation of the counterweight 60 on the flywheel 56 is achieved simply by aligning the counterweight dimple 70 with a corresponding alignment dimple 76 formed on the central flywheel surface portion 74. The importance of aligning the counterweight with the flywheel in this manner is reinforced by the words "IMPORTANT ALIGN DIMPLES" stamped on the counterweight base portion 62 on both sides thereof, the alignment dimple 70 also being visible on both sides of the counterweight.

With the counterweight 60 in its correctly aligned position depicted in FIG. 5, the locking and alignment arm portion 72 of the counterweight is closely received within the space between an adjacent pair $58_a$ and $58_b$ of the flywheel impeller blades 58. The blades $58_a$, $58_b$ thus cooperate with the arm portion 72 to prevent rotation of the counterweight 60 relative to the flywheel 56, thereby maintaining the counterweight in its correct rotational orientation relative to the flywheel during engine operation. The counterweight 60 is captively retained on the crankshaft 32, to prevent axial movement of the counterweight along the shaft, by a retainer sleeve 78 (see FIGS. 2-5) which is slidably mounted on the crankshaft 32 and engages at its opposite ends the clutch assembly 54 and the counterweight 60.

As illustrated in FIGS. 7A and 7B, during operation of the engine 18 the counterweight 60 is rotated with the crankshaft 32 by virtue of the interaction between the flywheel impeller blades $58_a$ and $58_b$ and the locking arm portion 72 of the counterweight 60. During the period in which the piston 44 is adjacent its TDC and BDC positions, the counterweight axis 64 is swung through a parallel relationship with the piston axis 50 and the counterweight centrifugal force $F_{FC}$ is oppositely directed relative to the crankshaft reaction $R_I$ (FIG. 6A). The counterweight centrifugal force $F_{FC}$ creates on the crankshaft a moment $M_{FC}$ (FIG. 6C) which is equal to the product of $F_{FC}$ and $L_{FC}$ (FIG. 6B) and directly counters the crankshaft rocking moment $M_I$ (FIG. 6C) created by the piston and connecting rod during the period directly before and directly after the piston's attainment of its TDC and BDC positions, thereby substantially reducing inertially induced engine vibration transmitted to the crankshaft by the piston and connecting rod.

The unique use of the inexpensive and easy to manufacture flywheel-associated counterweight 60 provides a variety of advantages over conventional techniques employed to reduce inertially induced vibration in single cylinder internal combustion engines. Perhaps the most important advantage provided by the counterweight 60 is that it produces the aforementioned engine balancing effects without in any manner altering the balance of the flywheel.

Although the counterweight cooperates with the flywheel to hold the counterweight in the correct rotational orientation on the crankshaft, the counterweight is connected directly to the crankshaft and transmits its corrective centrifugal force directly thereto—it does not transmit such centrifugal force to the crankshaft through the flywheel. Accordingly, the counterweight does not in any manner impose a centrifugal bursting force upon the flywheel.

Additionally as described above, the counterweight 60 may be quite easily and rapidly installed on the engine, and is just as quick and easy to properly align with the flywheel. The unique cooperation between the flywheel impeller blades and the locking arm portion of the counterweight eliminates the necessity of providing other rotational locking means for the counterweight. Finally, the counterweight is very securely and safely connected to the crankshaft in a manner effectively precluding the dislodgment of the counterweight therefrom.

The foregoing detailed description is to be clearly understood as being given by way of illustration and example only, the spirit and scope of the present invention being limited solely by the appended claims.

What is claimed is:

1. A single cylinder internal combustion engine comprising:

crankshaft means rotationally drivable about a crankshaft axis;

bearing means, engaging said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connected rod means when, during engine operation, said piston means are adjacent said top dead center and bottom dead center positions thereof, said counterweight means including a counterweight member captively retained on said second end portion of said crankshaft means, said engine further comprising alignment means for maintaining said counterweight member in a predetermined rotational orientation on said second end portion of said crankshaft means, and said alignment means including cooperating means on said flywheel means and said counterweight member.

2. The engine of claim 1 wherein:

said flywheel means have a circumferentially spaced series of axially extending cooling impeller blades thereon;

said counterweight member has a locking arm portion, and said cooperating means include an adjacent pair of said impeller blades and said locking arm portion, said locking arm portion being closely received and retained between said adjacent pair of said impeller blades.

3. A single cylinder internal combustion engine comprising:

crankshaft means rotationally drivable about a crankshaft axis;

bearing means, engaing said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during engine operation, said piston means are adjacent said top dead center and bottom dead center positions thereof, said counterweight means including a counterweight member captively retained on said second end portion of said crankshaft means, said engine further comprising alignment means for maintaining said counterweight member in a predetermined rotational orientation on said second end portion of said crankshaft means, and said counterweight member being closely adjacent said flywheel means, and said alignment means including alignable visual indicia means formed on adjacent portions of said flywheel means and said counterweight member.

4. The engine of claim 3 wherein:

said visual indicia means include alignable dimples formed on said counterweight member and said flywheel means.

5. A single cylinder internal combustion engine comprising:

crankshaft means rotationally drivable about a crankshaft axis;

bearing means, engaging said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during engine operation, said piston means are adjacent said top dead center and bottom dead center positions thereof, said counterweight means including a counterweight member captively retained on said second end portion of said crankshaft means, said engine further comprising alignment means for maintaining said counterweight member in a predetermined rotational orientation on said second end portion of said crankshaft means, and said counterweight member being captively retained on said second end portion of said crankshaft means by a tubular collar member slidably received on said second end portion of said crankshaft means and having an end portion bearing against said counterweight member.

6. A single cylinder internal combustion engine comprising:

crankshaft means rotationally drivable about a crankshaft axis:

bearing means, engaging said crankshaft means between opposite first and second end portions thereof, for supporting said crankshaft means for drive rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during engine operation, said piston means are adjacent said top dead center and bottom dead center positions thereof, said counterweight means including a counterweight member extending along a counterweight axis perpendicular to said crankshaft axis and having a body portion slidably mounted and captively retained on said second end portion of said crankshaft means closely adjacent said flywheel means, and a locking arm portion, said flywheel means having a circumferentially spaced series of axially extending cooling impeller blades, said locking arm portion of said counterweight member being closely received and retained between an adjacent pair of said impeller blades, and said adjacent pair of said impeller blades holding said counterweight member in a rotational orientation relative to said flywheel means such that, during engine operation, said counterweight axis is swung through a parallel relationship with said piston axis during periods in which said piston means are adjacent said top dead center and bottom dead center positions thereof, and said counterweight member exerts a centrifugal force upon said second end portion of said crankshaft means in the same direction as said linear inertial and reactive forces during such periods.

7. A power tool comprising:

drivable working means for receiving power from a source thereof and being responsively moved to perform a predetermined work function; and single cylinder internal combustion engine means operative to drive said working means and including:

crankshaft means rotationally drivable about a crankshaft axis;

bearing means, engaing said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to drive reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during operation of said engine means, said piston means are adjacent said top dead center and bottom dead center positions thereof, said counterweight means including a counterweight member captively retained on said second end portion of said crankshaft means, said engine means further comprising alignment means for maintaining said counterweight member in a predetermined rotational orientation on said second end portion of said crankshaft means, and said alignment means including cooperating means on said flywheel means and said counterweight member.

8. The power tool of claim 7 wherein:

said flywheel means have a circumferentially spaced series of axially extending cooling impeller blades thereon, said cooperating means include an adjacent pair of said impeller blades and said locking arm portion, said locking arm portion being closely received and retained between said adjacent pair of said impeller blades.

9. A power tool comprising:

drivable working means for receiving power from a source thereof and being responsively moved to perform a predetermined work function; and single cylinder internal combustion engine means operative to drive said working means and including:

crankshaft means rotationally drivable about a crankshaft axis;

bearing means, engaging said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during operation of said engine means, said piston means are adjacent said top dead center and bottom dead center positions thereof, said counterweight means including a counterweight member captively retained on said second end portion of said crankshaft means, said engine means further comprising alignment means for maintaining said counterweight member in a predetermined rotational orientation on said second end portion of said crankshaft means, and said counterweight member being closely adjacent said flywheel means, and said alignment means including alignable visual indicia means formed on adjacent portions of said flywheel means and said counterweight member.

10. The power tool of claim 9 wherein:

said visual indicia means comprise alignable dimples formed on adjacent portions of said flywheel means and said counterweight member.

11. A power tool comprising:

drivable working means for receiving power from a source thereof and being responsively moved to perform a predetermined work function; and single cylinder internal combustion engine means operative to drive said working means and including:

crankshaft means rotationally drivable about a crankshaft axis;

bearing means, engaging said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during operation of said engine means, said piston means are adjacent said top dead center and bottom dead center positions thereof, said counterweight means including a counterweight member captively retained on said second end portion of said crankshaft means, said engine means further comprising alignment means for maintaining said counterweight member in a predetermined rotational orientation on said second end portion of said crankshaft means, and said counterweight member being captively retained on said second end portion of said crankshaft means by a tubular collar member slidably received on said second end portion of said crankshaft means and having an end portion bearing against said counterweight member.

12. A power tool comprising:

drivable working means for receiving power from a source thereof and being responsively moved to perform a predetermined work function; and single cylinder internal combustion engine means operative to drive said working means and including:

crankshaft means rotationally drivable about a crankshaft axis;

bearing means, engaging said crankshaft means between opposite first and second end portions thereof, for supporting said crankshaft means for driven rotation about said crankshaft axis;

piston means reciprocably drivable along a piston axis transverse to said crankshaft axis, said piston means having top dead center and bottom dead center positions;

connecting rod means, interconnected between said piston means and said first end portion of said crankshaft means, for causing rotation of said crankshaft means about said crankshaft axis in response to driven reciprocation of said piston means along said piston axis;

flywheel means coaxially mounted on said second end portion of said crankshaft means for driven rotation therewith about said crankshaft axis; and counterweight means, connected directly to said second end portion of said crankshaft means, for substantially reducing engine vibration attributable to linear inertial and reactive forces transmitted to said first end portion of said crankshaft means by said piston means and said connecting rod means when, during operation of said engine means, said piston means are adjacent said top dead center and bottom dead center positions thereof, said counterweight means including a counterweight member captively retained on said second end portion of said crankshaft means, said engine means further comprising alignment means for maintaining said counterweight member in a predetermined rotational orientation on said second end portion of said crankshaft means, and said counterweight means including a counterweight member extending along a counterweight axis perpendicular to said crankshaft axis and having a body portion slidably mounted and catpively retained on said second end portion of said crankshaft means closely adjacent said flywheel means, and a locking arm portion, said flywheel means having a circumferentially spaced series of axially extending cooling impeller blades, said locking arm portion of said counterweight member being closely received and retained between an adjacent pair of said blades, and said adjacent pair of said impeller blades holding said counterweight member in a rotational orientation relative to said flywheel means such that during operation of said engine means said counterweight axis is swung through a generally parallel realtionship with said piston axis during periods in which said piston means are adjacent said top dead center and bottom dead center positions thereof, and said counterweight member exerts a centrifugal force upon said second end portion of said crankshaft means in essentially the same direction as said linear inertial and reactive forces during such periods.

13. An engine comprising:

a crankshaft supported for driven rotation about a crankshaft axis;

a piston reciprocably drivable along a piston axis transverse to said crankshaft axis, said piston having top dead center and bottom dead center positions;

a connecting rod interconnected between said piston and said crankshaft for rotationally driving said crankshaft about said crankshaft axis in response to driven reciprocation of said piston along said piston axis;

A flywheel coaxially mounted on said crankshaft for driven rotation thereby about said crankshaft axis; and counterweight means, secured to said crankshaft and drivingly engaged by said flywheel for rotation thereby about said crankshaft axis, for substantially reducing engine vibration attributable to linear inertial and reactive forces transmitted to said crankshaft by said piston and said connecting rod when, during engine operation, said piston is adjacent said top dead center and bottom dead center positions thereof.

14. The engine of claim 13 wherein:
said flywheel has a circumferentially space duality of axial extending projections thereon, and
said counterweight means include a counterweight member having an inner end portion captively retained on said crankshaft, and an outer end portion captively retained between said duality of projections on said flywheel.

15. The engine of claim 14 wherein:
said duality of projections on said flywheel are cooling impeller blade elements.

16. The engine of claim 13 wherein:
said engine is a single cylinder internal combustion engine.

17. A power tool comprising:
drivable working means for receiving power from a source thereof and being responsively moved to perform a predetermined work function; and
engine means operative to drive said working means and including:
a crankshaft supported for driven rotation about a crankshft axis,
a piston reciprocably drivable along a piston axis transverse to said crankshaft axis, said piston having top dead center and bottom dead center positions,
a connecting rod interconnected between said piston and said crankshaft for rotationally driving said crankshaft about said crankshaft axis in response to driven reciprocation of said piston along said piston axis,
a flywheel coaxially mounted on said crankshaft for driven rotation thereby about said crankshaft axis, and
counterweight means, secured to said crankshaft and drivingly engaged by said flywheel for rotation thereby about said crankshaft axis, for substantially reducing engine vibration attributable to linear inertial and reactive forces transmitted to said crankshaft by said piston and said connecting rod when, during engine operation, said piston is adjacent said top dead center and bottom dead center positions thereof.

18. The power tool of claim 17 wherein:
said flywheel has a circumferentially spaced series of axially projecting cooling impeller blades thereon, and
said counterweight means include a counterweight member having an inner end portion captively retained on said crankshaft, and an outer end portion captively retained between a circumferentially adjacent pair of said cooling impeller blades.

19. The power tool of claim 17 wherein:
said power tool is a rotary power tool having an elongated shaft,
said engine means comprise a single cylinder internal combustion engine secured to one end of said shaft,
said working means comprise a rotatable structure secured to the opposite end of said shaft, and
said rotary power tool further has power transfer means for operatively transmitting power from said engine means to said rotatable structure.

20. The power tool of claim 19 wherein: said rotary power tool is a flexible line trimmer, and said rotatable structure is a cutting head assembly.

* * * * *

UNITED STATES PATENT AND TRADEMARK OFFICE
CERTIFICATE OF CORRECTION

PATENT NO. : 4,846,123

DATED : July 11, 1989

INVENTOR(S) : Albert M. Bolton, Jr.

It is certified that error appears in the above-identified patent and that said Letters Patent is hereby corrected as shown below:

Column 9, line 50, "drive" should be --driven--.

Column 10, line 9, insert the paragraph --said counterweight member has a locking arm portion, and---.

Signed and Sealed this

Twelfth Day of March, 1991

*Attest:*

HARRY F. MANBECK, JR.

*Attesting Officer*      *Commissioner of Patents and Trademarks*